(12) United States Patent
Gruen et al.

(10) Patent No.: US 6,393,460 B1
(45) Date of Patent: May 21, 2002

(54) METHOD AND SYSTEM FOR INFORMING USERS OF SUBJECTS OF DISCUSSION IN ON-LINE CHATS

(75) Inventors: Daniel M. Gruen, Newton; Mark A. Sheldon, Arlington, both of MA (US); Shivakumar Vaithaynathan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,075

(22) Filed: Aug. 28, 1998

(51) Int. Cl.[7] .............................................. G06F 13/00
(52) U.S. Cl. ..................................................... 709/204
(58) Field of Search ................................ 709/200, 203, 709/204, 205, 217, 218, 219, 227, 228

(56) References Cited

U.S. PATENT DOCUMENTS

| | | | | |
|---|---|---|---|---|
| 5,784,568 A | * | 7/1998 | Needham | 709/234 |
| 5,787,274 A | | 7/1998 | Agrawal et al. | 707/102 |
| 5,793,365 A | * | 8/1998 | Tang et al. | 345/758 |
| 5,857,179 A | | 1/1999 | Vaithyanathan et al. | 707/2 |
| 5,956,509 A | * | 9/1999 | Kevner | 709/330 |
| 5,987,503 A | * | 11/1999 | Murakami | 709/204 |
| 6,014,136 A | * | 1/2000 | Ogasawara et al. | 709/205 |

OTHER PUBLICATIONS

Allerton 96, Bruce L. Lambert, Content Analysis via Document Clustering, http://edfu.lis.uiuc.edu/allerton/96/lambert.html, 1 page.
Three–Automatic Classification, http://www.dcs.gla.ac.uk/Keith/Chapter.3/Ch.3.html, 24 pgs.
Almaden Research Center, http://www.almaden.ibm.com, 1 page.
Importance and Centroid Sampling, http://www.anu.edu.au/Forestry/mensuration/importan.htm, Apr. 29, 1997, 3 pgs.
Fulcrum White Paper: Knowledge Acquisition and Management in the Knowledge–Based Economy, Mar. 1977, http://www.fulcrum.com/english/products/wpaper1.htm, 11 pgs.
Internet Parallel Computing Archive Mirror Sites, http://www.hensa.ac.uk/parallel/www/mirror–sites.html, 9 pgs.
New Release from the Linguistic Data Consortium and Celex, Corporate List Oct. 1995 to present, http://nora.hd.uib.nocorpora/1995–4/0124.html, 6 pgs.
Http://www.cs.dartmouth.edu/reports/abstracts/TR97–318/TR97–318.bibte, Abstract, 1 page.
Bruce L. Lambert, The Theme Machine: Theoretical Foundation and Summary of Methods, University of Illinois at Chicago, 23 pgs.

* cited by examiner

Primary Examiner—Moustafa M. Meky
(74) Attorney, Agent, or Firm—Brown Raysman Millstein Felder & Steiner LLP

(57) ABSTRACT

A method for informing a user of topics of discussion in a recorded chat between two or more people is described. The method includes the steps of identifying elements from the chat having similar content, labeling some or all of the identified elements as topics, and presenting the topics to the user. Identifying elements from the chat having similar content includes decomposing the chat into utterances made by the people involved in the chat and clustering the utterances using document clustering techniques on each utterance to identify elements in the utterances having similar content.

38 Claims, 6 Drawing Sheets

METHOD AND SYSTEM FOR INFORMING USERS OF SUBJECTS OF DISCUSSION IN ON-LINE CHATS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to information retrieval systems, and particularly, to systems and methods for providing users with helpful information about the contents of chats including ongoing on-line chats.

Real-time textual conversations, commonly known as chats, have become increasingly popular among both personal and business computer users. Chats occur as conversations between two people, as conferences among larger groups, and in persistent chat rooms or spaces accessible to a larger community who can drop in, read what was recently written, and contribute if they desire. Chats are widely available over local and wide area networks, and are particularly popular among users of on-line services and the Internet.

The textual nature of chat makes it particularly valuable in some settings. Chat can be conducted while people are on the phone, allowing it to be used as a second channel for exchanging information. Because of the persistent nature of text, a user can catch up on anything that was said in a chat if they were momentarily distracted or interrupted. Chat can be an inexpensive and lightweight way for people to exchange information in real time. These and other reasons contribute to the growing use of chat in business settings and the increasing incorporation of chat into the offerings of major software manufacturers.

Chats frequently contain important information that users will want to access at a later time. This can include specific details, such as a phone number or address, lists of tasks the user must remember to perform, and broader discussions and ideas. While mechanisms have been designed to allow users to save the transcript of a chat session for later retrieval, these identify the saved transcripts only by such details as the date, time and/or participants in the chat or require the user to manually assign a single name to the conversation. They do not provide an automatic and convenient way for transcripts to be identified by the topics they cover.

Because of the conversational and often informal nature of chat, a single conversation can concern a number of topics, intertwined temporally and frequently shifting from one topic to another. A person presented with a chat transcript, both when retrieving a past transcript and joining a conversation in progress, must scan through the entire transcript to know what was discussed or to find a topic of interest.

In addition, while some existing systems give others awareness that people are involved in a currently occurring conversation in which they could participate, they do not inform them of the specific topics being discussed. The user must access the chat transcript and read through it to determine if an issue of interest is being discussed.

There is therefore a need for systems and methods for allowing users to quickly determine the contents of a chat and to monitor the progress of ongoing chats and the topics being discussed therein.

SUMMARY OF THE INVENTION

It is an object of the present invention to solve the problems described above with existing chat systems.

It is another object of the present invention to automatically label a chat transcript by the topics it includes.

It is another object of the present invention to allow users to easily locate the portions of a chat transcript dealing with a specific topic.

It is another object of the present invention to allow users to easily discern the topic under current discussion in an ongoing chat without monitoring the complete text.

It is another object of the present invention to automatically notify potential chat participants when topics of interest to them are under discussion.

It is another object of the present invention to allow users to easily determine the topics discussed in a chat transcript.

It is another object of the present invention to automatically categorize and topically index the contents of a chat session through statistical analysis of its contents.

The above and other objects are achieved by a method for informing a user of topics of discussion in a recorded chat between two or more people. The method includes the steps of identifying elements from the chat having similar content, labeling some or all of the identified elements as topics, and presenting the topics to the user. In some embodiments, identifying elements from the chat having similar content includes the steps of decomposing the chat into a plurality of utterances made by the people involved in the chat and clustering the utterances to identify elements in the utterances having similar content.

Furthermore, each decomposed utterance is parsed into one or more tokens and represented as a vector comprising a combination of some or all of the one or more tokens. In the case of a previously recorded chat which is no longer ongoing, some of the tokens in the utterance may be removed before representing the utterance as a vector. The tokens removed include tokens appearing in a percentage of all utterances in the chat which is below a low percentage or above a high percentage. In the case of an ongoing chat, in which such percentages cannot be determined because the full chat record is not yet available, all tokens in the utterance are included in the vector. The tokens in each vector are weighted by frequency of their occurrence in the utterance or chat as a whole, and a vector-space model is generated from all the vectors.

Standard clustering techniques are used to cluster the utterances based on the vector space model created from the vectors and tokens. In the case of a previously recorded chat, clustering is performed on each utterance. In the case of ongoing chats, clustering is performed in accordance with a process which accounts for the dynamically changing nature of the chat content. The process involves receiving a first set of ongoing chat data from the ongoing chat, decomposing the first set of ongoing chat data into a plurality of first utterances, and, when a first number of first utterances has been received, clustering the first utterances to generate a plurality of first clusters. As the chat continues, a second set of ongoing chat data is received and decomposed into a plurality of second utterances, which utterances are clustered into the first clusters when a second number of second utterances has been received. A new cluster is performed under certain conditions by breaking the largest of the existing cluster into two or more smaller clusters. The result is an ever changing collection of topics representing the subject matter under discussion in the chat.

Salient phrases and keywords are automatically extracted from the topics for use in labeling the chat transcript and creating a dynamic listing of the topics it contains. The listing serves as an active table-of-contents, allowing users to easily access the portions of the chat transcript it references. A variety of textual and graphical displays may be used to provide an overview at a glance of the locations in a chat transcript in which each of its topics was discussed. The keywords identifying the topic under current discussion in an ongoing chat can be displayed, allowing users to decide at a glance if they wish to participate. A number of chat conversations may be automatically monitored, and users notified when a topic in which they have previously, through deliberate setting or observed actions, indicated an interest.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

In accordance with the invention, automatically clustering the utterances of a chat identifies elements of the chat with similar content. Extracting statistically significant labels from the utterances identifies the topics associated with the clusters. These labels then act as a summary of topics discussed, a description of active topics at a specific time, such as the current topic, or a table of contents into the chat for later searching. Two general clustering processes are described herein, one for off-line processing and one for on-line processing.

Figure 1:
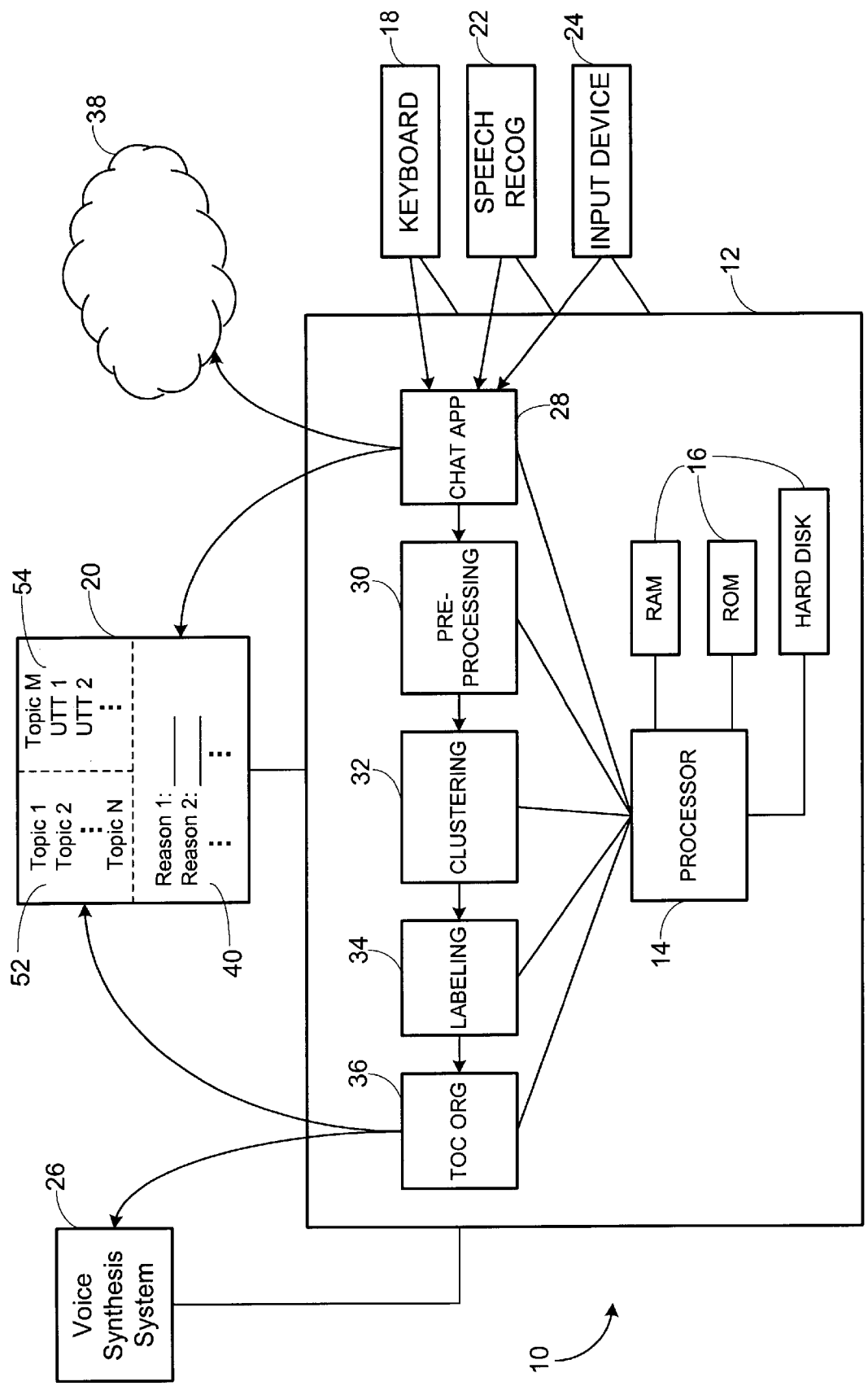
FIG. 1 is a block diagram showing a computer system for processing and clustering a chat in accordance with one embodiment of the present invention.

A system and method of preferred embodiments of the present invention are now described with reference to FIGS. 1–4B. Referring to FIG. 1, a system 10 of one embodiment of the present invention includes a computer system 12, which may be a personal computer, networked computers, or other conventional computer architecture, has a processor 14, volatile and nonvolatile memory devices 16, a keyboard 18, and a display 20. The system 10 may include additional or alternative input devices such as a speech recognition system 22, including a microphone and speech recognition software such as the ViaVoice™ software available from IBM Corp., the assignee of the present application, to translate speech into digital data, as well as other convention input devices 24 such as a mouse, electronic stylus, etc. The system 10 may further include additional output devices such as a voice synthesis system 26, printer, or other conventional device.

In accordance with the present invention, a number of software programs or program modules or routines reside and operate on the computer system 12. These include a chat application 28, a chat preprocessor 30, a clustering program 32, a labeler 34, and a table of contents or index generator 36. The chat application 28 may be any conventional chat application, such as VP-Buddy from Ubique and Instant Messenger from AOL. The chat application 28 receives input from a local user of the computer system 12 through one or more of the input devices 18, 22, 24 and receives input from one or more remote users trough a local or wide area network 38, including over the Internet, an on-line service, a telephone network, or other telecommunication connection.

The system 10 collects chat transcripts, decomposes chats into individual utterances, cluster treats each utterance as a separate document, and extracts labels from each cluster. The preprocessor 30 collects the chat transcripts by using existing chat logs kept by the particular chat application 28. The preprocessor 30 decomposes the chat into individual utterances in several possible ways depending on the application. In one embodiment, ad hoc parsing techniques specific to the transcript file format of the chat application 28 to identify each utterance and write it to a separate file. In a real time chat environment, the utterances may be individually logged or sent to the input queue of the clustering engine 32 as each utterance is sent.

The clustering engine 32, which may be any on-line clustering algorithm including conventional ones such as the k-means clustering algorithm described in L. Bottou and Y. Bengio, *Convergence Properties of the K-Means Algorithm*, in *Advances in Neural Information Processing Systems* 7, pages 585–592 (MIT Press 1995), which is hereby incorporated by reference into this application. Several examples of additional document clustering algorithms are described in the following two documents, which are hereby incorporated by reference into this application. Douglas R. Cutting, David R. Karger, Jan O. Pedersen, John W. Tukey, *Scatter/Gather: A Cluster-based Approach to Browsing Large Document Collections*. In Proceedings of the 15th Annual International ACM SIGIR Conference. Association for Computing Machinery. N3w York. June, 1992. Pages 318–329. Gerard Salton. *Introduction to Modern Information Retrieval*, (McGraw-Hill, Now York. 1983).

The clustering engine 32 treats each utterance as a separate document, and converts each document or utterance to a feature vector. Features are the words used in the utterance, key phrases, and other attributes such as time, date, and author. In particular embodiments, the natural language parsing capabilities of the Textract™ information retrieval program available from IBM Corp. are used. Textract's ability to locate proper names is described in the following two articles, which are hereby incorporated by reference into this application: Yael Ravin and Nina Wacholder, *Extracting Names from Natural-Language Text*, IBM Research report RC 20338, T. J. Watson Research Center, IBM Research Division, Yorktown Heights, N.Y., April 1997; and Nina Wacholder, Yael Ravin, and Misook Choi, *Disambiguation of proper Names in Text*, Proceedings of the Fifth Conference on Applied Natural Language Processing, pages 202–208, Washington D.C., March 1997. Textract may be used only to identify key noun phrases.

The feature vector for an utterance has a non-zero weight for every feature present in the utterance. The weight is based on the frequency of the feature in the document, its type (e.g., whether an author field, word, or phrase), and its distribution over the collection. Once an utterance is represented as a feature vector, a similarity measure is defined on utterances. The similarity measure is then used to group related utterances.

The labeling engine 34 selects the most statistically significant features to label as clusters. Noun phrases are advantageously selected as labels because they are typically more meaningful to users. The table of contents engine 36 organizes the labels received from the labeling engine 34

Figure 2:
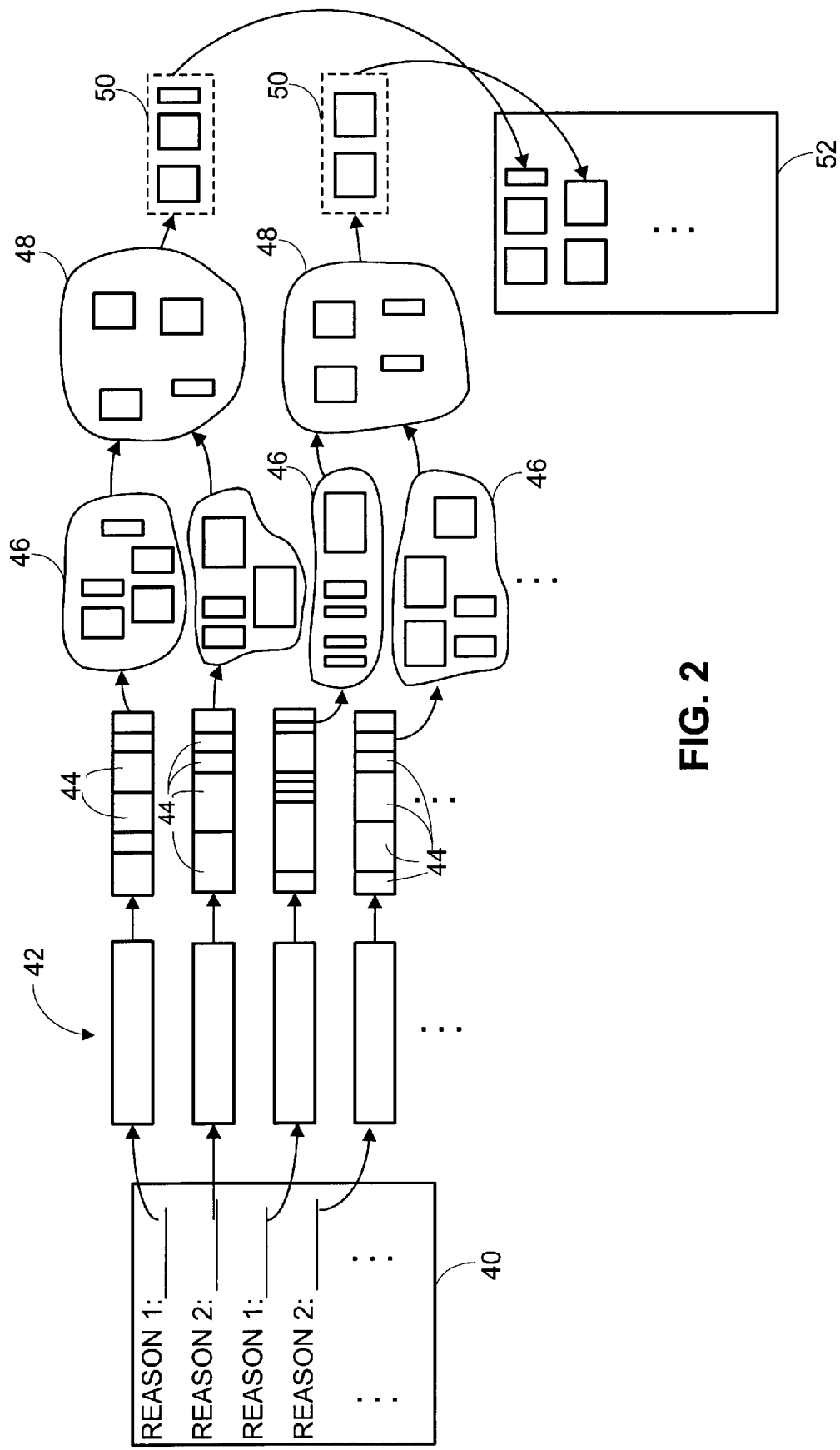
FIG. 2 is a flow diagram showing one process performed by the system of FIG. 1 for decomposing and clustering a chat in accordance with the present invention.
Figure 3A:
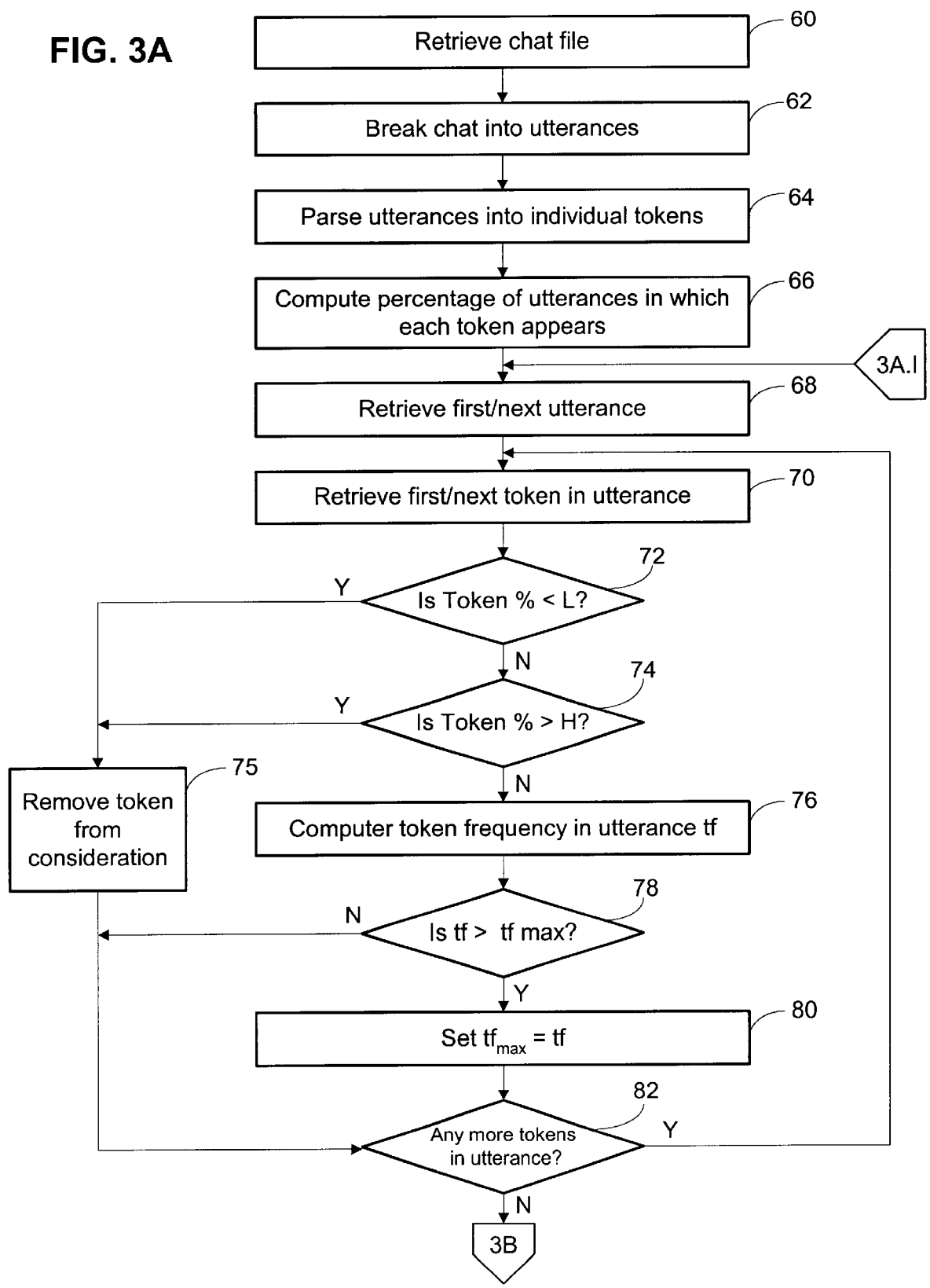
FIGS. 3A–3B is a flow chart showing the process of indexing a previously recorded chat in accordance with one embodiment of the invention.
Figure 3B:
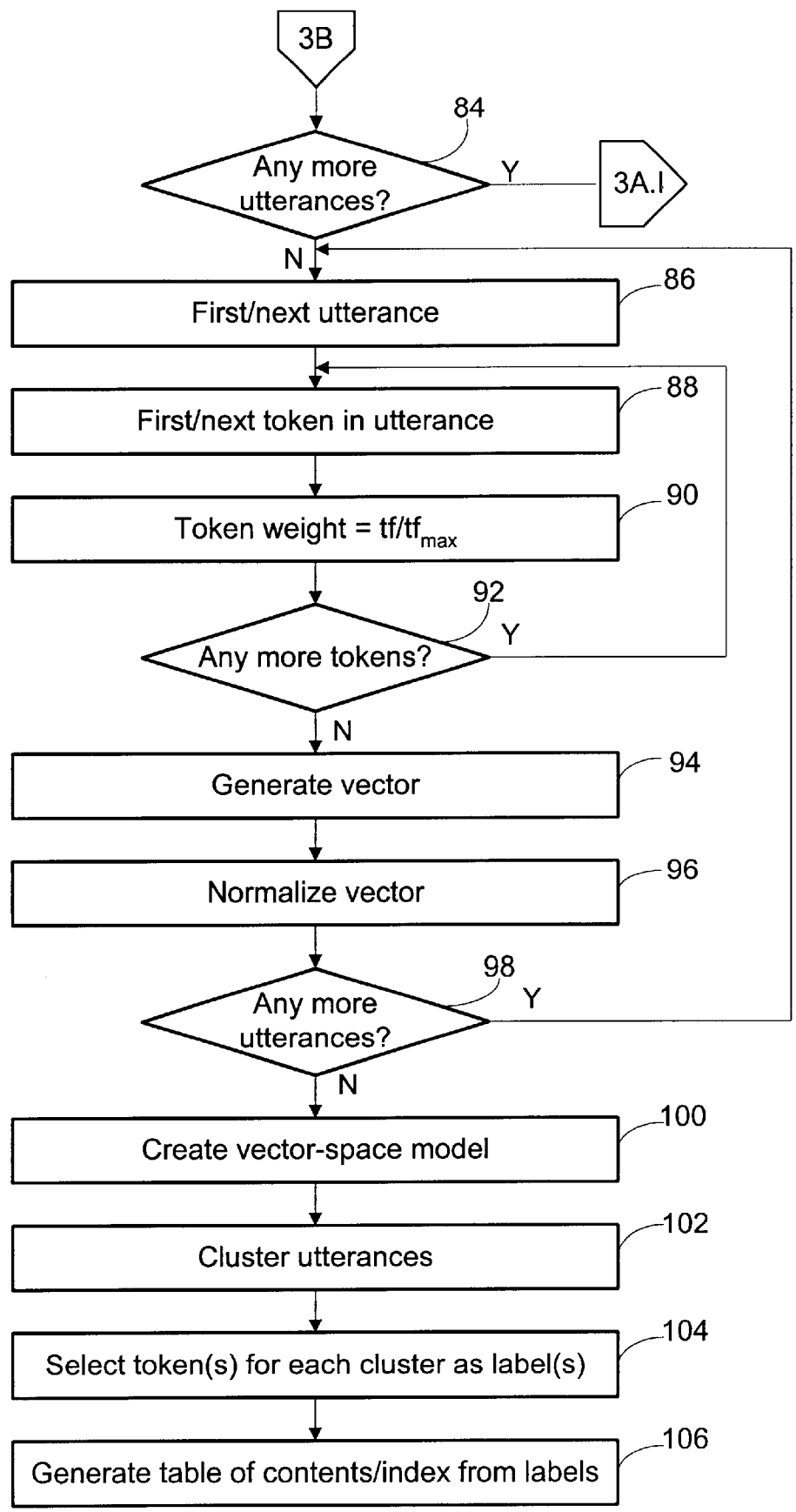

Particular methods for processing and clustering off-line, completed chat sessions and on-line, ongoing chat sessions are now described with reference to the flow diagram of FIG. 2 and the flow charts in FIGS. 3A–3B and 4A–4B. For off-line chats, a chat transcript file 40 (FIG. 2) is retrieved, step 60 (FIG. 3A), and the chat transcript broken into separate utterances 42, step 62. An utterance 42 is a particular entry by a participant in the chat session, or may be any other convenient logical block or portion of the chat. The utterances 42 are then parsed into individual tokens 44, step 64, the tokens containing individual words or word phrases.

In off-line chat preprocessing, some tokens in each utterance may be removed from consideration because they are less relevant or meaningful to users. Tokens that appear in relatively very few utterances likely do not represent a truly relevant aspect of the discussion, and tokens that appear in a large percentage of utterances are likely commonplace words such as articles. Thus, the preprocessor computes the percentage of utterances in which each token appears, step 66. Then, each utterance is considered, step 68, and each token in the utterance is considered, step 70. For the given token, if the percentage associated with that token is either less than a predefined lower limit percentage L, step 72, or higher than a predefined upper limit percentage H, step 74, the token is removed from the utterance, step 75. Alternatively, all tokens may be retained, and utterances in both off-line and on-line clustering processes may be subjected to a stop list, which filters the utterances to remove certain words known to have little value in information retrieval, such as a, an, but, the, or, etc.

For each remaining token, a token frequency $tf$ is computed, step 76, as the frequency of the given token in that utterance, and compared to $tf_{max}$, which is the largest token frequency of any term in the utterance, initially set to 0 for each utterance. If $tf$ for a given token exceeds the current value of $tf_{max}$ for that utterance, then $tf_{max}$ is set equal to $tf$, step 80. Once all tokens in the utterance have been considered, the current value of $tf_{max}$ will represent the maximum token frequency for the utterance.

When all tokens in each utterance have been considered, step 82, and all utterances in the chat transcript considered, step 84 (FIG. 3B), each utterance is represented as a vector in a vector-space model. Thus, each utterance is considered, step 86, and each token in a given utterance considered, step 88. Each token is given a weight in each utterance according to the formula $tf/tf_{max}$, step 90. Other possible formulas include a binary value (1 if the term occurs in the document, 0 if it does not), and a traditional $tfidf$ measure where the frequency of the term in the utterance is divided by the number of documents in the collection that contain the term. In the case of on-line clustering, discussed further below, the inverse document frequency would simply use the number of documents up to the present time that contain the term.

If all tokens have been assigned weights step 92, a vector is generated as the combination of the weighted tokens, step 94. Each vector is then normalized to a unit vector, i.e., a vector of length 1, step 96. This is accomplished, in accordance with standard linear algebra techniques, by dividing each token's weight by the square root of the sum of the squares of the token weights of all tokens in the vector.

When all utterances have been considered and converted into vectors, step 98, the vectors are converted to a vector space model, step 100, which is a matrix where the number of rows is equal to the number of utterances and the number of columns is equal to the number of tokens retained to form the vector-space representation. This will be referred to as document-token matrix. In retrospective or off-line clustering of chats, the number of vectors to be clustered is equal to the number of utterances. The matrix resulting from the preprocessing is sparse, i.e., very few of the cells in the document-token matrix are non-zeros.

The vectors or utterances are then clustered separately, step 102. This clustering can be performed in several conventional ways known to those of skill in the art, including in ways described in the Salton and Cutting references referred to above. The clustering results in a set of clusters 46 (FIG. 2) which may then be grouped into groups of clusters 48 based on similar content. This process of hierarchical clustering is accomplished by computing a centroid document, which is often a vector where each token weight is the average of the token weights for that token for all vectors in the cluster. Each centroid is treated as a document, and each cluster is represented as a centroid. The process of clustering is performed again on the centroid representing clusters, generating a new, cluster containing one or more old clusters. This process of hierarchical clustering may be performed a desired number of times or until a predefined criteria is reached.

The clusters are then assigned label 50 by selecting some of the tokens in the cluster 46 or cluster group 48, step 104. The labeling of document clusters is known to those of skill in the art, and is described for example in pages 314–323 of Peter G. Anick and Shivakumar Vaithyanathan, *Exploiting Clustering and Phrases for Context-based Information Retrieval*, in Proceedings of the 20th International ACM SIGIR Conference, Association for Computing Machinery, July 1997, which document is hereby incorporated by reference into this application. Problems may arise in chat clustering since the utterances are usually not very well formed and there are potentially very large number of spelling mistakes. The process of labeling chat clustering is restricted to picking semantically meaningful and important words and phrases in each cluster, wherein words are considered important when they satisfy predefined statistical criteria similar to the generation of token weights.

Once labels have been assigned, a table of contents or index 52 is generated, step 106, by, in one embodiment, arranging the labels in an order generally reflective of the order of the tokens in the utterances or in any other desired order. The table of contents 40 and chat transcript may be shown together on the display 20, as shown in FIG. 1, such as by the use of framing techniques known to those of skill in the art. An additional frame 54 may be provided for displaying a cluster associated with a given label selected from the index 52. In some embodiment, the labels may be hyperlinked to documents containing the cluster group information, such as through the use of HTML anchors. The cluster group information may contain a list of the utterances in the group, each utterance being hyperlinked to the same utterance in the chat transcript 40. As a result, a user may quickly and easily navigate from the index 52, to the group were utterances are shown, and ultimately to the position within the chat transcript where the utterance occurs.

On-line or ongoing chat clustering (OCC) is a slightly more difficult problem than of-line clustering. One way of looking at the OCC problem is that of a constantly evolving problem that the system attempts to track using a clustering process. The purpose of the on-line clustering is two-fold:

1. Classify an existing utterance into one of existing clusters/classes.
2. Ascertain whether a new utterance should start a new cluster.

For on-line clustering, the system has to perform the same general three steps as retrospective clustering, that is, preprocessing, clustering and labeling. However, the individual steps involved differ.

Figure 4A:
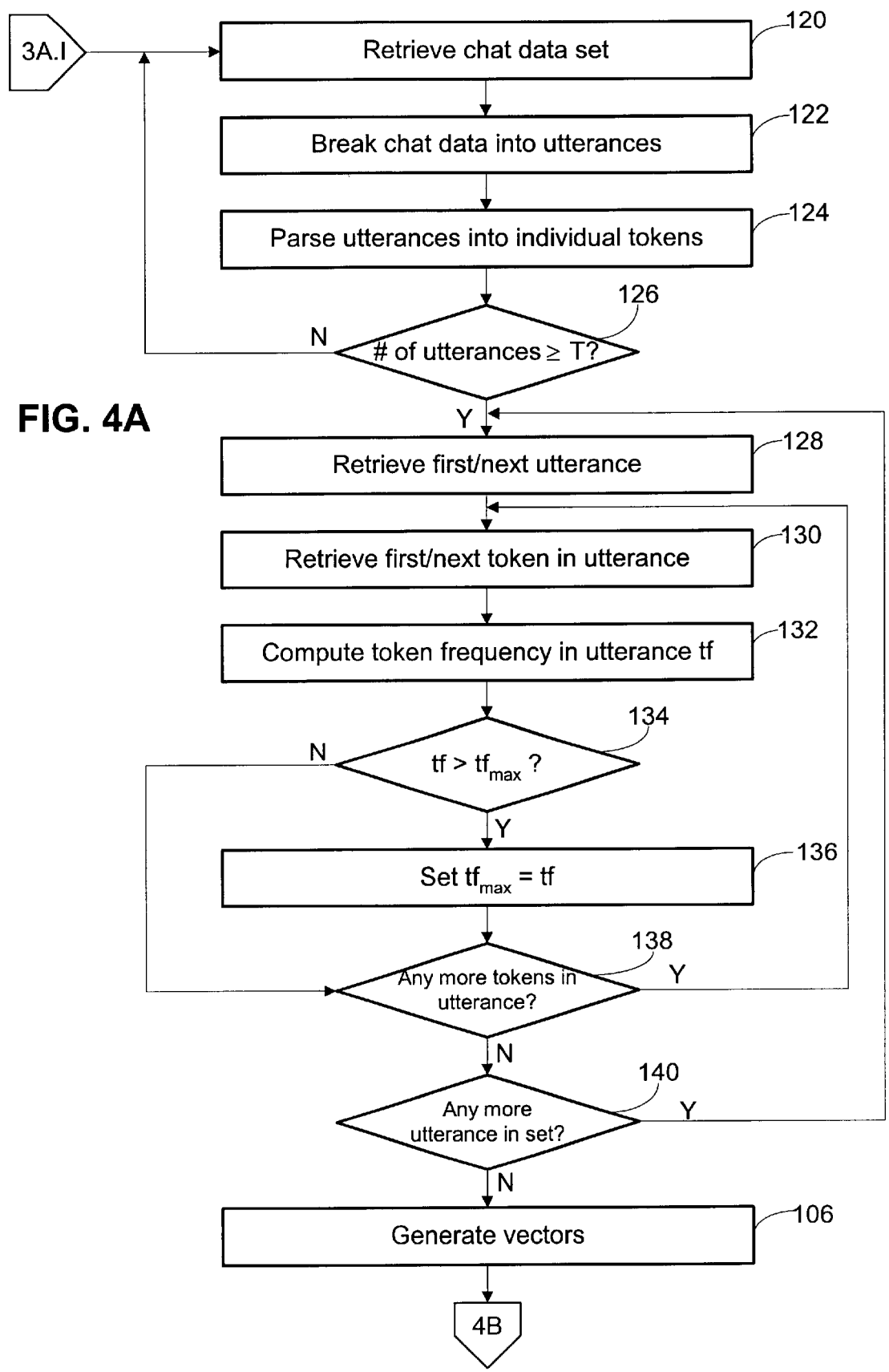
FIGS. 4A–4B is a flow chart showing the process of indexing an ongoing chat in accordance with one embodiment of the invention.
Figure 4B:
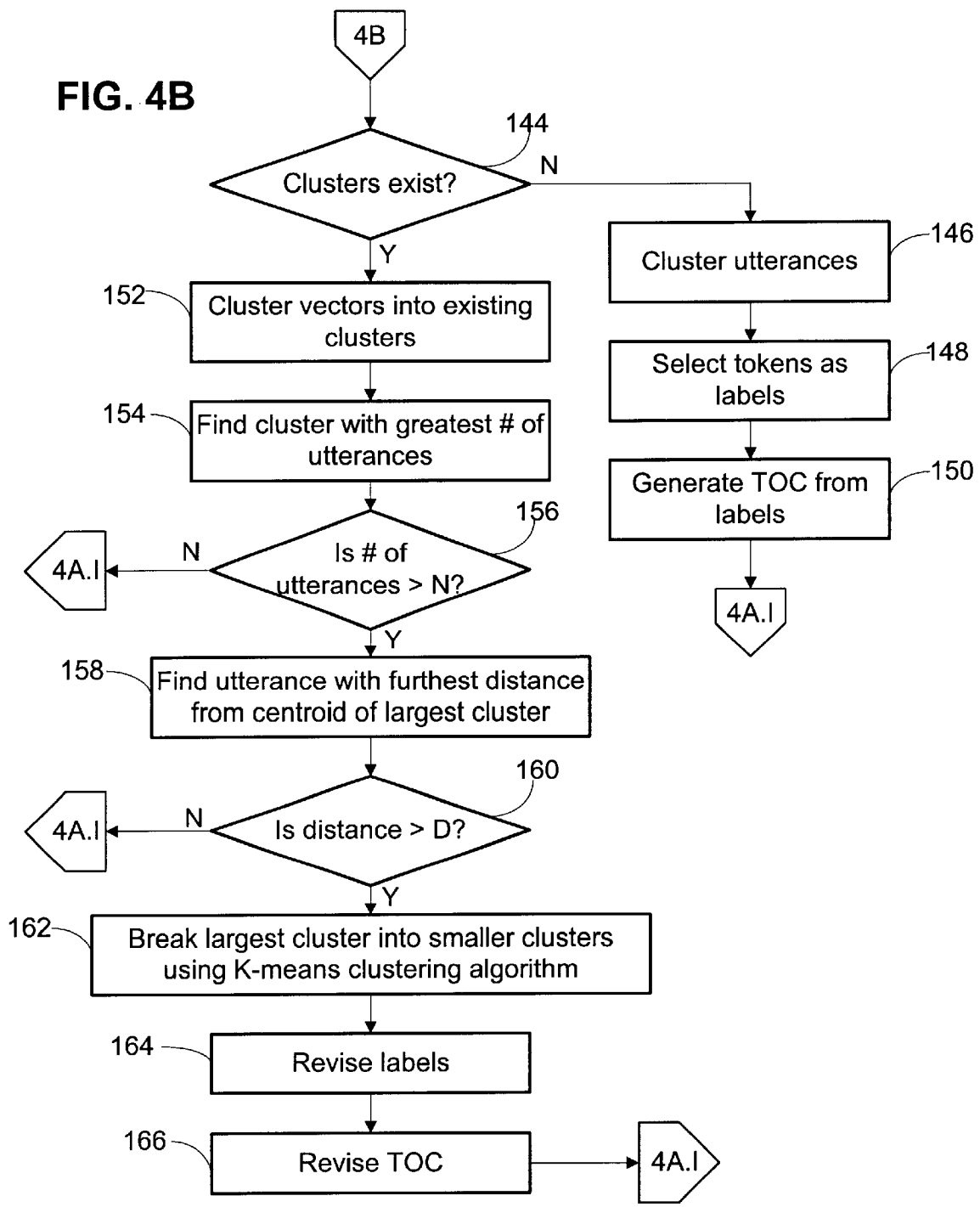

Referring to FIGS. 4A–4B, preprocessing of the chat sessions involves the steps of retrieving ongoing chat data, step 120, either continuously utterance by utterance or in sets, breaking the chat data retrieved into separate utterances, step 122, and parsing the utterances into individual tokens, step 124.

Chat data is retrieved until the number of utterances reaches a predefined threshold T, step 126, which is sufficient to create a meaningful data set. When the threshold is reached, each utterance retrieved is considered, step 12, and each token in each utterance considered, step 130. In on-line chat clustering, all tokens are retained in the utterances as they are needed to represent the vector-space model. As with off-line clustering, each token is given a weight $tf/tf_{max}$ by computing $tf$, step 132, comparing $tf$ for the given token to the running variable $tf_{max}$, and updating $tf_{max}$ until the maximum frequency is found for the utterance. Using inverse document frequencies in the on-line case is problematic because weights of the same term at different times are not really comparable because they will have different document frequencies. On the other hand, updating the weight of a term in all past documents it occurs in every time it appears in a new document, that is, re-evaluating its weight, and reclustering is currently computationally prohibitive. It may also lead to unstable clustering of prefixes of the chat.

When all tokens in each utterance, step 138, and all utterances in the current chat data set, step 140, have been processed, each utterance is represented as a vector in the vectors pace model, step 142. Each vector is normalized to a unit vector, as in off-line clustering.

If clusters do not already exist, step 144, then this set of utterances represents the first set retrieved from the ongoing chat. In that case, the utterances are clustered using any conventional clustering algorithm as with off-line clustering, step 146, tokens from the clusters are selected as labels, step 148, and a table of contents is generated from the labels, step 150, and presented to the user.

The system continues retrieving additional data from the chat, step 120, and processing the data in the same fashion. When the number of new utterances is greater than or equal to T, step 126, vectors are created for the new utterances as described above. Since clusters already exist, step 144, the new vectors are clustered into the existing clusters, step 152. In one embodiment, on-line clustering of utterances is performed by computing the dot-product of the new utterance with each of the centroids of the existing clusters. A new cluster can be formed in several ways, including, for example, by forming a new cluster using the on-line clustering algorithm if the nearest neighbor of all the cluster centroids is less than a pre-determined threshold t in distance.

The system then determines whether to break up any clusters. First, the system finds the cluster with the greatest number of utterances, step 154. If that cluster has more utterances than a predefined threshold N, step 156, then the system finds the utterance with the furthest distance from the centroid of the largest cluster, step 158. If this distance exceeds a predefined distance D, the cluster is broken into two or more smaller clusters using the k-means clustering algorithm, step 162. The labels are then revised to reflect the change in clusters, step 164, and the table of contents or index also revised accordingly, step 166. The system continues to retrieve new chat data sets and proceeds in an iterative fashion as described.

As an alternative, the clustering process may involve use of the Minimum Description Length (MDL) approach, described in U.S. Pat. No. 5,787,274, which is hereby incorporated by reference. In this embodiment, the new utterance is assigned to one of the existing clusters, by ignoring the pre-determined threshold, based on a nearest neighbor evaluation using the on-line k-means clustering algorithm. After a pre-determined number of new utterances have been collected, the overall likelihood of the data is evaluated, conditioned on the existing partition. The cluster with the lowest likelihood is selected and split into two clusters, using a batch version of the k-means clustering algorithm. The likelihood of the new partition is then computed, noting that in this case the number of clusters is one more than in the previous case. The two computed likelihoods are compared after adding an MDL penalty, the MDL criterion acting as a regularizer. The number of clusters to retain is selected based on this computation.

Labeling is performed identically to labeling in off-line, retrospective clustering.

As a result, these various embodiments of the present invention provide users with a powerful, effective and easy to use tool to quickly determine the contents of a chat transcript and to monitor an ongoing chat without having to In addition, the system may be programmed to accept and store specific words or phrases which the user desires to monitor, and to inform the user when these words or phrases are found by virtue of the chat clustering process described herein.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for informing a user of topics of discussion in a recorded chat between two or more people, the method comprising:

identifying elements from the chat having similar content, comprising decomposing the chat into a plurality of utterances made by the people involved in the chat and clustering the utterances to identify elements in the utterances having similar content, the identifying comprising parsing each decomposed utterance of the plurality of utterances into one or more tokens and representing each utterance as a vector comprising a combination of some or all of the one or more tokens;

labeling some or all of the identified elements as topics; and presenting the topics to the user.

2. The method of claim 1, wherein the step of representing each utterance as a vector comprises removing some of the tokens in the utterance before representing the utterance as a vector.

3. The method of claim 2, wherein the chat is not ongoing, and wherein the step of removing some tokens comprises removing tokens appearing in a percentage of all utterances in the chat which is below a first percentage or above a second percentage.

4. The method of claim 1, wherein the chat is ongoing, and wherein the step of representing each utterance as a vector comprises representing all tokens in the utterance in the vector.

5. The method of claim 1, wherein the step of representing each utterance as a vector comprises weighting each token in the vector.

6. The method of claim 5, wherein the step of weighting each token comprises computing the weight of a each token as the frequency of occurrence of the token in the utterance divided by the largest frequency of occurrence for any token in the utterance.

7. The method of claim 5, wherein the step of weighting each token comprises computing the weight of each token as the frequency.

8. The method of claim 5, comprising normalizing each vector.

9. The method of claim 1, comprising generating a vector space model comprising a matrix having a plurality of rows and a plurality of columns, wherein the number of rows equals the number of utterances represented by vectors and the number of columns equals the number of tokens contained in the vectors.

10. The method of claim 3, wherein the step of presenting the topics comprises hyperlinking each utterance in the documents to a location in which the respective utterance appears.

11. The method of claim 10, wherein the step of presenting the topics comprises hyperlinking each utterance in the documents to a location in the chat in which the respective utterance appears.

12. The method of claim 3, wherein the step of labeling comprises selecting some of the topics according to a predefined criteria.

13. The method of claim 12, wherein the step of selecting some of the topics comprises identifying topics which are nouns or noun phrases and selecting the topics so identified.

14. A method for informing a user of topics of discussion in a recorded, ongoing chat between two or more people, the method comprising:
    identifying elements from the chat having similar content, comprising:
        receiving a first set of ongoing chat data from the ongoing chat;
        decomposing the first set of ongoing chat data into a plurality of first utterances;
        when a first number of first utterances has been received, clustering the first utterances to generate a plurality of first clusters;
        receiving a second set of ongoing chat data from the ongoing chat after the first set of ongoing chat data;
        decomposing the second set of ongoing chat data into a plurality of second utterances; and
        when a second number of second utterances has been received, clustering the second utterances into the plurality of first clusters;
    labeling some or all of the identified elements as topics; and
    presenting the topics to the user.

15. A method for clustering an ongoing chat, the method comprising:
    receiving ongoing chat data;
    decomposing a first set of ongoing chat data into a plurality of first utterances;
    when a first number of first utterances has been received, clustering the first utterances to generate a plurality of first clusters;
    decomposing a second set of ongoing chat data received after the first set of ongoing chat data into a plurality of second utterances; and
    when a second number of second utterances has been received, clustering the second utterances into the plurality of first clusters.

16. The method of claim 15, comprising parsing each of the first and second utterances into tokens.

17. The method of claim 16, comprising representing each utterance as a vector comprising a combination of the tokens in the utterance.

18. The method of claim 17, wherein the step of representing each utterance as a vector comprises weighting each token in the vector.

19. The method of claim 18, wherein the step of weighting each token comprises computing the weight of each token as the frequency of occurrence of the token in the utterance divided by the largest frequency of occurrence for any token in the utterance.

20. The method of claim 15, comprising generating a new cluster after clustering the second utterances into the first clusters.

21. The method of claim 20, wherein the step of generating the new cluster comprises identifying a given cluster as larger than all other clusters and selectively breaking the largest cluster into two or more smaller clusters.

22. The method of claim 21, identifying a cluster having a centroid which is further from the largest cluster than all other clusters, and wherein the step of breaking the largest cluster into two or more clusters is performed if the largest cluster contains a number of utterances greater than a predefined number and the distance of the largest cluster from the centroid of the furthest cluster exceeds a predefined distance.

23. The method of claim 21, wherein the step of breaking the largest cluster comprising breaking the largest cluster using a k-means clustering technique.

24. A method for identifying elements from a chat having similar content, the method comprising:
    decomposing the chat into a plurality of utterances made by the people involved in the chat;
    parsing each decomposed utterance into one or more tokens;
    representing each utterance as a vector comprising a combination of some or all of the one or more tokens; and
    clustering the utterances using the vectors to identify elements in the utterances having similar content.

25. An article of manufacture comprising a computer readable medium containing a program which when executed on a computer causes the computer to perform a method for informing a user of topics of discussion in a recorded chat between two or more people, the method comprising:
    identifying elements from the chat having similar content, comprising decomposing the chat into a plurality of utterances made by the people involved in the chat and clustering the utterances to identify elements in the utterances having similar content, the identifying comprising parsing each decomposed utterance of the plurality of utterances into one or more tokens and representing each utterance as a vector comprising a combination of some or all of the one or more tokens;

labeling some or all of the identified elements as topics; and presenting the topics to the user.

26. The article of manufacture of claim 25, wherein the step of representing each utterance as a vector comprises removing some of the tokens in the utterance before representing the utterance as a vector.

27. The article of manufacture of claim 26, wherein the chat is not ongoing, and wherein the step of removing some tokens comprises removing tokens appearing in a percentage of all utterances in the chat which is below a first percentage or above a second percentage.

28. The article of manufacture of claim 25, wherein the chat is ongoing, and wherein the step of representing each utterance as a vector comprises representing all tokens in the utterance in the vector.

29. The article of manufacture of claim 25, wherein the step of representing each utterance as a vector comprises weighting each token in the vector.

30. The article of manufacture of claim 29, wherein the step of weighting each token comprises computing the weight of a each token as the frequency of occurrence of the token in the utterance divided by the largest frequency of occurrence for any token in the utterance.

31. The article of manufacture of claim 29, wherein the step of weighting each token comprises computing the weight of each token as the frequency.

32. The article of manufacture of claim 29, comprising normalizing each vector.

33. The article of manufacture of claim 25, comprising generating a vector space model comprising a matrix having a plurality of rows and a plurality of columns, wherein the number of rows equals the number of utterances represented by vectors and the number of columns equals the number of tokens contained in the vectors.

34. The article of manufacture of claim 25, wherein the step of presenting the topics comprises hyperlinking the topics to documents containing utterances having the respective identified elements.

35. The article of manufacture of claim 34, wherein the step of presenting the topics comprises hyperlinking each utterance in the documents to a location in the chat in which the respective utterance appears.

36. The article of manufacture of claim 25, wherein the step of labeling comprises selecting some of the topics according to a predefined criteria.

37. The article of manufacture of claim 36, wherein the step of selecting some of the topics comprises identifying topics which are nouns or noun phrases and selecting the topics so identified.

38. An article of manufacture comprising a computer readable medium containing a program which when executed on a computer causes the computer to perform a method for informing a user of topics of discussion in a recorded, ongoing chat between two or more people, the method comprising:

identifying elements from the chat having similar content, comprising:

receiving a first set of ongoing chat data from the ongoing chat;

decomposing the first set of ongoing chat data into a plurality of first utterances;

when a first number of first utterances has been received, clustering the first utterances to generate a plurality of first clusters;

receiving a second set of ongoing chat data from the ongoing chat after the first set of ongoing chat data;

decomposing the second set of ongoing chat data into a plurality of second utterances; and when a second number of second utterances has been received, clustering the second utterances into the plurality of first clusters;

labeling some or all of the identified elements as topics; and presenting the topics to the user.

* * * * *